(12) United States Patent
Wang

(10) Patent No.: US 7,697,280 B2
(45) Date of Patent: Apr. 13, 2010

(54) SLIDING MECHANISM FOR PORTABLE ELECTRONIC DEVICE

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 64 days.

(21) Appl. No.: 12/125,882

(22) Filed: May 22, 2008

(65) Prior Publication Data

US 2009/0168334 A1 Jul. 2, 2009

(30) Foreign Application Priority Data

Dec. 27, 2007 (CN) .................. 2007 1 0203443

(51) Int. Cl.
*H05K 7/16* (2006.01)
(52) U.S. Cl. .................. 361/679.55; 361/679.56; 455/575.4
(58) Field of Classification Search .......... 361/679.56, 361/679.55; 455/575.4
See application file for complete search history.

(56) References Cited

U.S. PATENT DOCUMENTS

| 7,529,081 B2 * | 5/2009 | Harmon et al. .......... 361/679.3 |
| 7,529,573 B2 * | 5/2009 | Kim .................. 455/575.4 |
| 2008/0096619 A1 * | 4/2008 | Kuga et al. ............. 455/575.4 |

* cited by examiner

*Primary Examiner*—Jayprakash N Gandhi
*Assistant Examiner*—Ingrid Wright
(74) *Attorney, Agent, or Firm*—Zhigang Ma

(57) ABSTRACT

An exemplary sliding mechanism (100) used for a sliding-type portable electronic device, includes a sliding member (10), a sliding member (20), and a sliding module (30). The main housing defines a curved sliding groove (203) therein. The sliding module includes two movable arms (301, 302), an elastic member (50) positioned between the two movable arms, and two sliding pegs (402, 404). The sliding pegs are partially received in the sliding groove of the main housing. A first end of each movable arm is rotatably attached to the sliding member, and a second end opposite to the first end of each movable arm is fixed to one of the sliding pegs. Two ends of the elastic member are correspondingly fixed to the two movable arms for driving the movable arms to move towards each other.

11 Claims, 5 Drawing Sheets

SLIDING MECHANISM FOR PORTABLE ELECTRONIC DEVICE

BACKGROUND OF THE INVENTION

1. Field of the Invention

The present invention generally relates to sliding mechanisms, and more particularly, to a sliding mechanism used for a sliding-type portable electronic device.

2. Discussion of the Related Art

Sliding mechanisms are widely used in sliding-type portable electronic devices, such as sliding-type mobile phones and sliding-type personal digital assistants (PDAs).

Referring to FIGS. 4 and 5, a typical sliding mechanism generally includes a main housing 70, a sliding cover 80, and a sliding module 90 positioned in the main housing 70. The main housing 70 defines two sliding grooves 77 in an inner surface of the main housing 70 and the sliding cover 80 also defines two guiding grooves 86 in an inner surface of the sliding cover 80. Each of the sliding grooves 77 includes a straight portion (not labeled) and a slanting portion (not labeled) connecting to an end of the straight portion. The sliding module 90 includes a mounting frame 92, a tension spring 94, and a pair of guiding protrusions 98. The tension spring 94 and the guiding protrusions 98 are received in the mounting frame 92. The tension spring 94 is positioned between the pair of guiding protrusions 98, with an end fixed to one guiding protrusion 98 and an opposite end fixed to the other guiding protrusion 98. Each guiding protrusion 98 includes an end inserted into one of the guiding grooves 86 of the sliding cover 80 and an opposite end inserted into one of the sliding grooves 77 of the main housing 70. Each guiding protrusion 98 is slidable in the corresponding guiding groove 86 of the sliding cover 80.

If the sliding cover 80 slides relative to the main housing 70, the guiding protrusions 98 moves towards or away from each other, thereby elongating or shortening the tension spring 94. When the sliding module 90 with the sliding cover 80 slides in a slide range less than a length $L_1$, the sliding module 90 creates an elastic force for closing the sliding cover 80 relative to the main housing 70. When the sliding module 90 with the sliding cover 80 slides in a slide range larger than the length $L_1$ and less than a length $L_2$, the sliding module 90 creates an elastic force for opening the sliding cover 80 relative to the main housing 70.

However, when each guiding protrusion 98 slides across a corner between the straight portion and the slanting portion of each sliding groove 77, the sliding cover 80 is slightly displaced with the guiding protrusion 98. Therefore, the sliding cover 80 does not slide smoothly relative to the main housing 70. In addition, the tension spring 94 is easily damaged when being frequently expanded by the guiding protrusions 98, thereby shortening the life span of the sliding mechanism.

What is needed, therefore, is a new slide mechanism which overcomes the above-described shortcomings.

SUMMARY

An exemplary sliding mechanism includes a sliding member, a sliding member, and a sliding module. The main housing defines a curved sliding groove therein. The sliding module includes two movable arms, an elastic member positioned between the two movable arms, and two sliding pegs. The sliding pegs are partially received in the sliding groove of the main housing. A first end of each movable arm is rotatably attached to the sliding member, and a second end opposite to the first end of each movable arm is fixed to one of the sliding pegs. Two ends of the elastic member are correspondingly fixed to the two movable arms for driving the movable arms to move towards each other.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present sliding mechanism. Moreover, in the drawings, like reference numerals designate corresponding parts throughout the several views, and all the views are schematic.

DETAILED DESCRIPTION OF THE EMBODIMENTS

Reference will now be made to the drawings to describe exemplary embodiments of the present sliding mechanism in detail.

Figure 1:
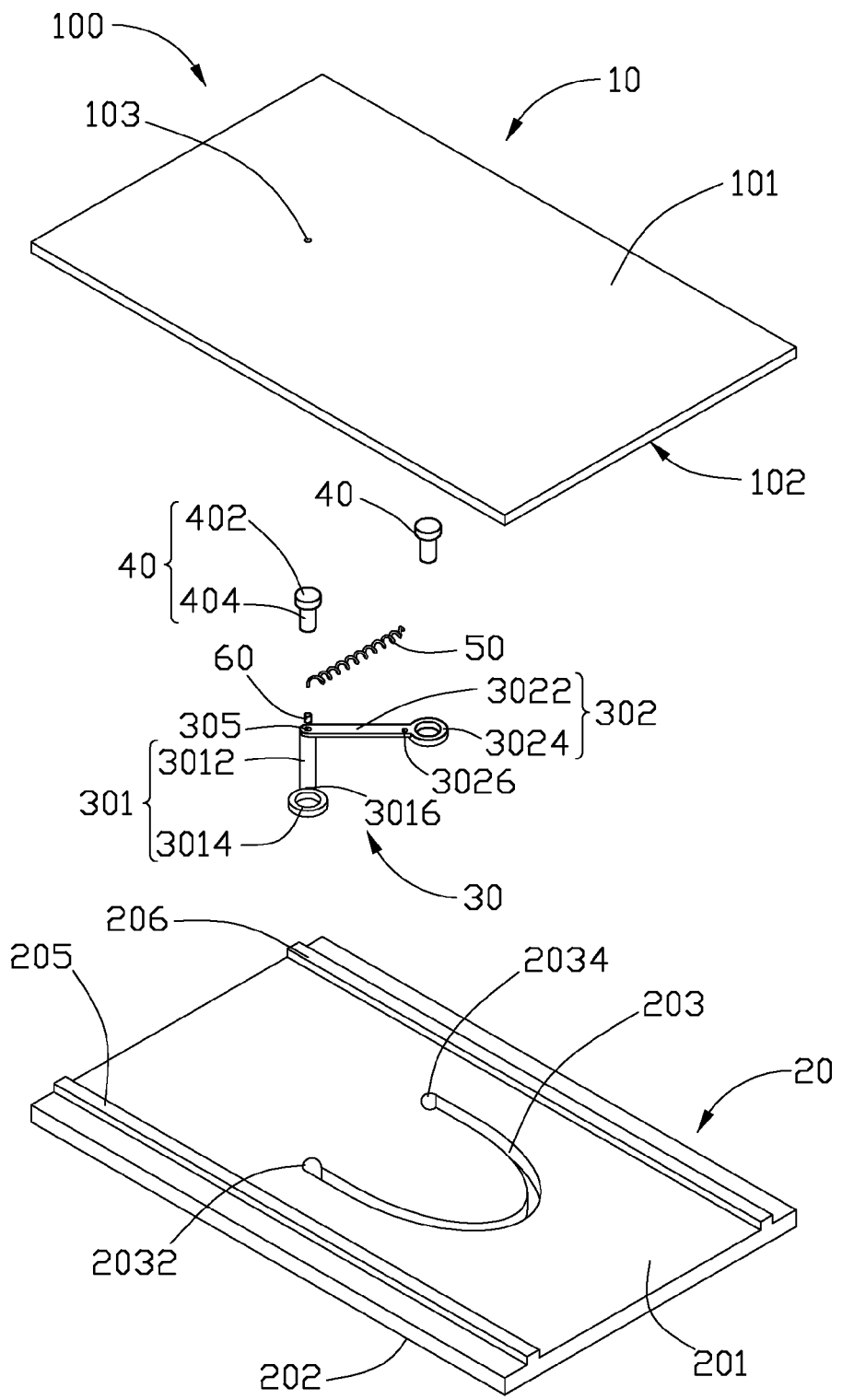
FIG. 1 is an exploded, isometric view of a sliding mechanism in accordance with an exemplary embodiment of the present invention.

Referring to FIG. 1, a sliding mechanism 100, according to an exemplary embodiment of the present invention, is adapted for use in a sliding-type portable electronic device such as a sliding-type mobile phone. The sliding mechanism 100 includes a sliding member 10, a main housing 20, a sliding module 30 positioned in the main housing 20.

The sliding member 10 is a rectangular sheet including an upper surface 101 and a bottom surface 102 on the other side of the sliding member 10 opposite to the upper surface 101. The sliding member 10 defines a fixing hole 103 that communicates between the upper surface 101 and the bottom surface 102.

The main housing 20 is also substantially a rectangular sheet including an upper surface 201 and a bottom surface 202 on the other side of the main housing 20 opposite to the upper surface 201. The main housing 20 defines a sliding groove 203 located about a middle portion of the upper surface 201. A shape of the sliding groove 203 is substantially U-shaped. The main housing 20 defines two retaining portions 2032, 2034 at opposite ends of the sliding groove 203 correspondingly. The retaining portions 2032, 2034 are indented inwards toward each other. The main housing 20 includes two elongated rails 205, 206 adjacent to opposite ends of the upper surface 201 correspondingly, thereby defining a receiving space for receiving the sliding module 30.

The sliding module 30 includes two movable arms 301, 302, two sliding pegs 40, a tension spring 50, and a connecting pivot pin 60.

In describe the embodiment, only one of the movable arms 301, 302 will be detailed. The movable arm 301 defines a pivot hole 305 in a first end of the first movable arm 301. A mounting portion 3014 is formed at a second end of the movable arm 301 opposite to the first end. The mounting portion 3014 is substantially a circular ring. The movable arm 301 further defines a spring latching hole 3016 adjacent to the mounting portion 3014.

Because the sliding pegs 40 are identical, only one of the sliding pegs 40 will be described. The sliding peg 40 includes a head portion 402 and an engaging portion 404 extending from an end of the head portion 402. The engaging portion 404 is preferably cylindrical. The engaging portion 404 is smaller in size than the head portion 402.

The tension spring 50 is a helical spring. The tension spring 50 includes two ends for latching in the spring latching holes 3016, 3026 of the movable arms 301, 302 correspondingly. The tension spring 50 is configured for creating an elastic force that pulls the movable arms 301, 302 towards each other after assembly.

The connecting pivot pin 60 is a cylindrical pole for engaging in the fixing hole 103 of the sliding member 10 and the pivot holes 305 of the movable arms 301,302. Thus, the movable arms 301, 302 are rotatable at the connecting pivot pin 60.

Figure 2:
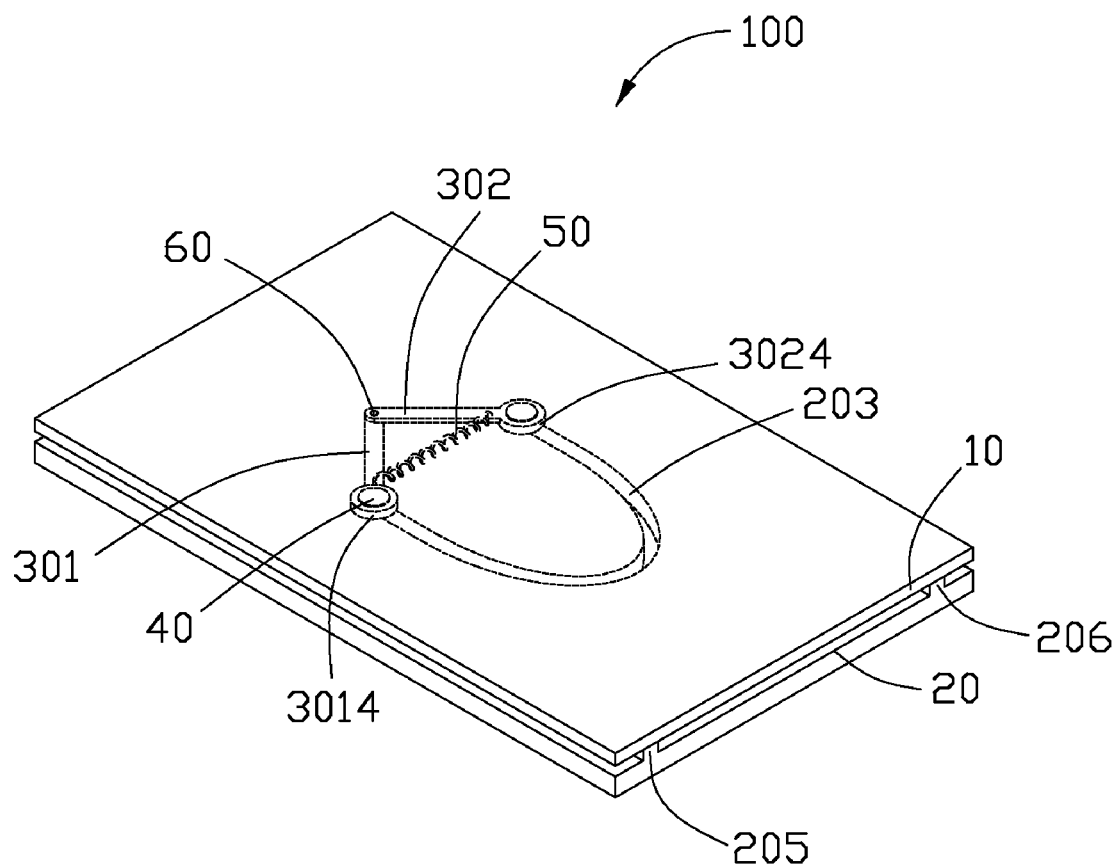
FIG. 2 is an assembled, isometric view of the sliding mechanism of FIG. 1, and illustrates a closed state of the sliding mechanism.

Referring to FIG. 2, to assemble the sliding mechanism 100, the movable arms 301, 302 are arranged atop of each other at the pivot holes 305. A first end of the connecting pivot pin 60 is inserted into the pivot holes 305 of the movable arms 301, 302, and a second end of the connecting pivot pin 60 opposite to the first end extends out of the pivot hole 305 of the movable arm 302. The engaging portions 404 of the sliding pegs 40 are inserted into the mounting portions 3014, 3024, correspondingly, and the sliding pegs 40 engage in the sliding groove 203 of the main housing 20. Two ends of the tension spring 50 are secured in the spring latching hole 3016, 3026 of the movable arms 301, 302 correspondingly. The slidable member 10 is then disposed on the main housing 20 such that the second end of the connecting pivot pin 60 is fixed in the fixing hole 103 of the sliding member 10.

In use, FIG. 2 shows a closed state of the sliding mechanism 100. In the closed state, referring also to FIG. 1, the sliding pegs 40 are retained in the retaining portions 2032, 2034 of the sliding groove 203. The tension spring 50 is in an expanded state and creates an elastic force for retaining the sliding pegs 40 in the retaining portions 2032, 2034 of the sliding groove 203, thereby keeping the sliding mechanism 100 in the closed state.

Figure 3:
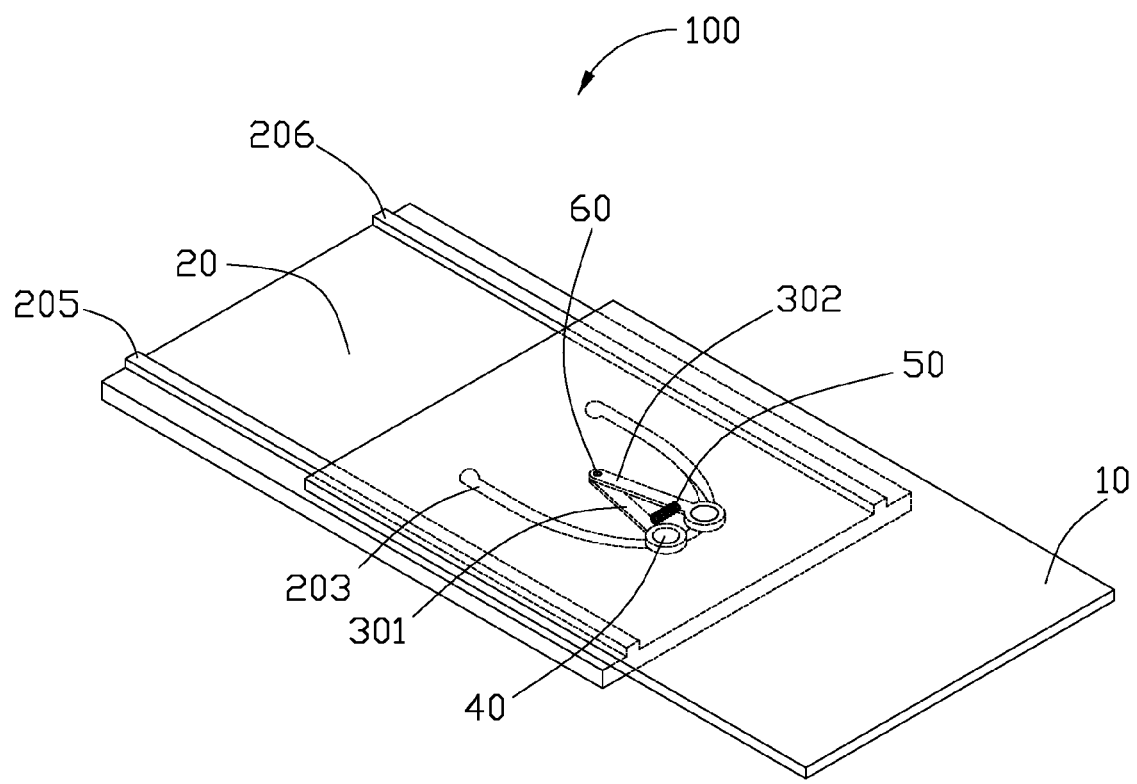
FIG. 3 is similar to FIG. 2, but illustrates an open state of the sliding mechanism.
Figure 4:
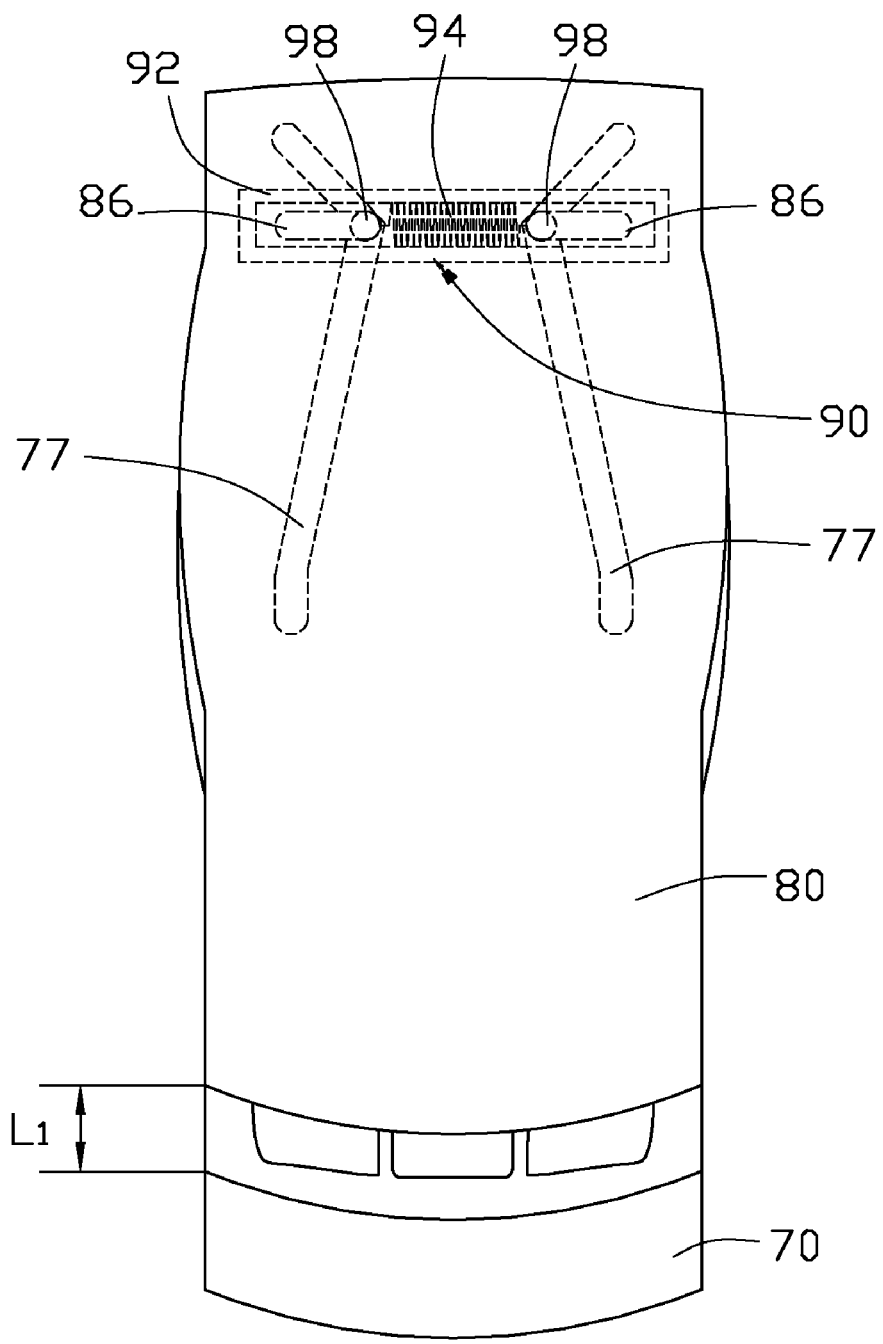
FIG. 4 is an assembled, isometric view of a typical sliding mechanism in a middle state.
Figure 5:
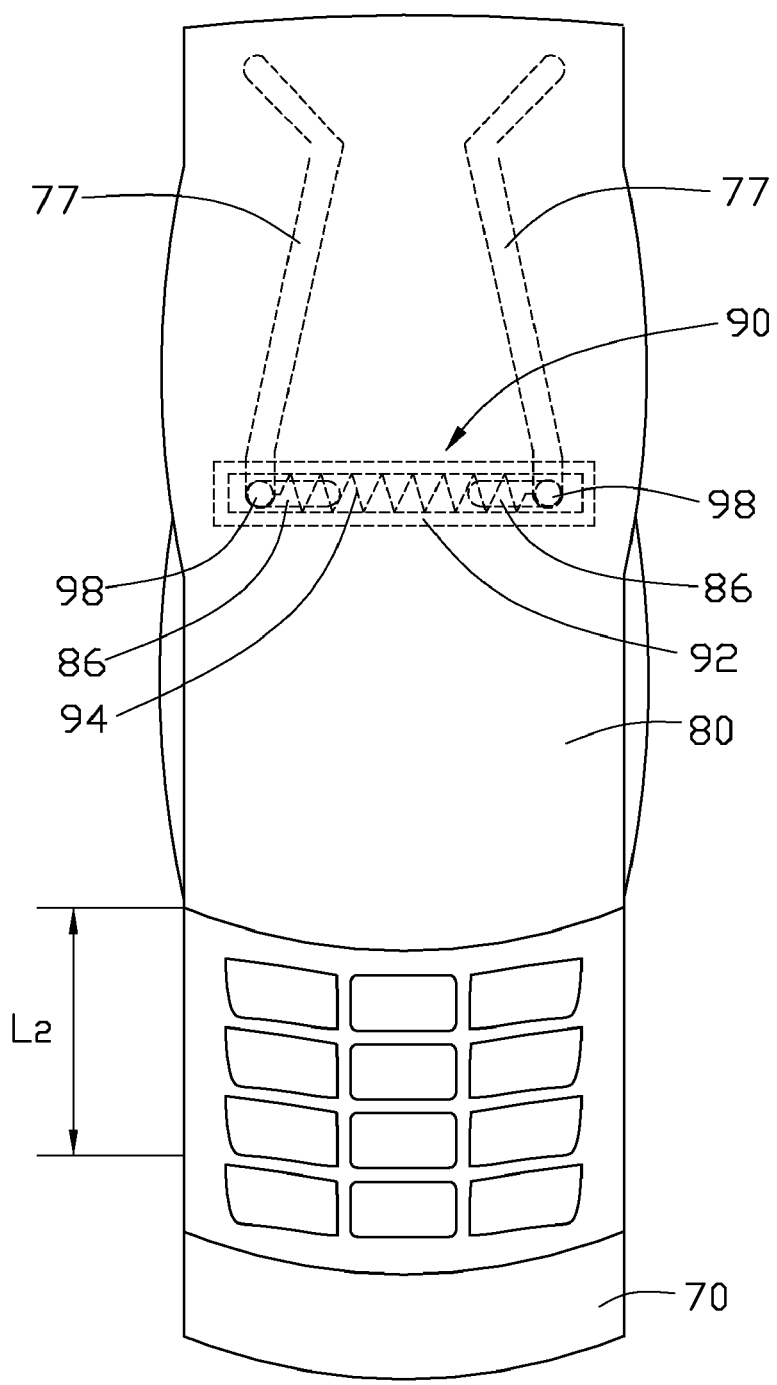
FIG. 5 is similar to FIG. 4, but illustrates an open state.

FIG. 3 shows an open state of the sliding mechanism 100. Referring also to FIG. 1, to open the sliding mechanism 100 from the closed state, an external force is applied on the sliding member 10, the sliding member 10 with the connecting pivot pin 60 slides relative to the main housing 20. The sliding pegs 40 are pushed out of the retaining portions 2032, 2034 of the sliding groove 203 and are pulled by a component force of the elastic force created by the tension spring 50 to slide towards the middle portion of the sliding groove 203. The tension spring 50 gradually becomes shorter and drives the mounting portions 3014, 3024 of the movable arms 301, 302 to move towards each other. When the sliding pegs 40 reaches the middle portion of the sliding groove 203, the mounting portions 3014, 3024 of the movable arms 301, 302 abuts each other, and the sliding mechanism 100 is in the open state. To close sliding mechanism 100, another external force is applied on the sliding member 10, the sliding member 10 with the connecting pivot pin 60 slides relative to the main housing 20, thus pulling the sliding pegs 40 to slide in the sliding groove 203 and expand the tension spring 50 until the sliding pegs 40 are retained in the retaining portions 2032, 2034 of the sliding groove 203.

The sliding groove 203 is a U-shaped groove in shape, thus the sliding pegs 40 slides in the sliding groove 203 stably and does not deviate from its linear motion with the sliding member 10. For the typical sliding mechanism, the tension spring 77 of the typical sliding mechanism goes from a semi-expanded position to being compressed and then expands again when opening the device. However, the sliding mechanism 100 of the present invention, the tension spring 50 goes from a compressed state to an expanded state. Thus, less wear and tear on the tension spring 50 than the tension spring 77 and the sliding mechanism 100 has a relatively long life span.

It should be pointed out that, the sliding groove 203 is not limited to a U-shaped groove and can also be other bended grooves such as a parabola groove. The tension spring 50 may be replaced by other elastic members such as torsion spring. The connecting pivot pin 60 may be replaced by other fixing members such as a screw. The sliding pegs 40 may be made integrally with the movable arms 301, 302 correspondingly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A sliding mechanism, used for a sliding-type portable electronic device, the sliding mechanism comprising:
   a sliding member;
   a main housing defining a curved sliding groove therein; and
   a sliding module including two movable arms, an elastic member positioned between the two movable arms, and two sliding pegs partially received in the sliding groove of the main housing, a first end of each movable arm rotatably attached to the sliding member, a second end, opposite to the first end, of each movable arm fixed to one of the sliding pegs, and two ends of the elastic member correspondingly fixed to the two movable arms for driving the movable arms to move towards each other;
   wherein each of the movable arms comprises a mounting portion formed at the second end, and the sliding pegs inserted into the mounting portions of the two movable arms correspondingly.

2. The sliding mechanism as claimed in claim 1, wherein the elastic member is a tension spring.

3. The sliding mechanism as claimed in claim 1, wherein the sliding member defines a fixing hole, and each of the movable arms defines a pivot hole in the first end corresponding to the fixing hole, the sliding module further comprises a connecting pivot pin, and the connecting pivot pin engages in the fixing hole of the sliding member and the pivot holes of the movable arms.

4. The sliding mechanism as claimed in claim 3, wherein the connecting pivot pin is a cylindrical pole.

5. The sliding mechanism as claimed in claim 3, wherein the sliding groove includes two retaining portions formed at opposite ends thereof for retaining the sliding pegs when the sliding mechanism is in a closed state.

6. The sliding mechanism as claimed in claim 1, wherein the sliding groove is substantially a U-shaped groove.

7. The sliding mechanism as claimed in claim 1, wherein the main housing comprises an upper surface and a bottom surface on the other side of the main housing opposite to the upper surface, the sliding groove is located about a middle portion of the upper surface.

8. The sliding mechanism as claimed in claim 1, wherein the main housing comprises two elongated rails positioned adjacent to opposite ends of the upper surface correspondingly.

9. The sliding mechanism as claimed in claim 1, wherein each of the sliding pegs comprises a head portion and an engaging portion extending from an end of the head portion, the engaging portions of the sliding pegs are inserted into the mounting portions correspondingly and engage in the sliding groove of the main housing.

10. The sliding mechanism as claimed in claim 9, wherein each of the mounting portions is substantially a circular ring, the engaging portion is cylindrical, and the engaging portion is smaller in size than the head portion.

11. The sliding mechanism as claimed in claim 1, wherein each of the movable arms further defines a spring latching hole adjacent to the mounting portion, the two ends of the tension spring are correspondingly secured to the spring latching hole of the movable arms.

* * * * *